United States Patent [19]

Schill et al.

[11] Patent Number: 5,009,350

[45] Date of Patent: Apr. 23, 1991

[54] RETAINER ASSEMBLIES FOR ELONGATED OBJECTS

[76] Inventors: John M. Schill, 208 Samuel Street, Kitchener, Ontario, Canada, N2H 1R6; William C. Schill, 18 Windy Ridge, Kitchener, Ontario, Canada, N2P 1N3

[21] Appl. No.: 404,379

[22] Filed: Sep. 8, 1989

[51] Int. Cl.⁵ ............................................. B60R 9/048
[52] U.S. Cl. ..................................... 224/324; 224/331; 182/127; 280/769
[58] Field of Search ................... 224/310, 319-325, 224/329, 330, 331, 917; 182/127; 248/503; 280/4, 769

[56] References Cited

U.S. PATENT DOCUMENTS

| | | | |
|---|---|---|---|
| 1,991,900 | 2/1935 | Larsen | 280/4 X |
| 2,134,823 | 11/1938 | Herrmann et al. | 248/503 X |
| 2,237,853 | 4/1941 | Troche | 248/503 X |
| 2,746,628 | 5/1956 | Neyra | 182/127 X |
| 2,840,288 | 6/1958 | Broddon | 224/324 X |
| 3,013,681 | 12/1961 | Garnett | 280/4 |
| 3,220,624 | 11/1965 | Hodak | 224/323 |
| 3,251,519 | 5/1966 | Jones | 224/324 |
| 3,904,094 | 9/1975 | Correll | 224/324 |
| 4,008,838 | 2/1977 | Correll | 182/127 X |
| 4,618,083 | 10/1986 | Weger, Jr. | 224/324 |

FOREIGN PATENT DOCUMENTS

| | | | |
|---|---|---|---|
| 1290264 | 3/1962 | France | 224/323 |
| 2225009 | 12/1974 | France | 224/324 |
| 2596343 | 10/1987 | France | 224/324 |

Primary Examiner—Henry J. Recla
Assistant Examiner—Robert M. Fetsuga
Attorney, Agent, or Firm—Rogers & Scott

[57] ABSTRACT

A retainer assembly can be clamped to a support cross-basr, such as is provided by a vehicle roof rack, and is able to retain an elongated member, such as an extension ladder, on the roof rack without the use of tools, clamps, tie-downs, etc. Each retainer assembly has a vertically-extending body, a transversely-extending part and a downwardly-extending retainer portion forming a retainer hook, the transversely-extending part being enclosed in a resilient sleeve. The ladder edge is inserted under the retainer hook while in an elevated attitude and then rotated downwards so that the edge rises up in the hook and compresses the sleeve, whereupon the ladder is held securely by the compressed sleeve between the retainer hooks and the cross-bars. The procedure is reversed to remove the object. The transversely extending part is adjustable vertically along the body, and the retainer portion is adjustable horizontally to accommodate ladders, etc. of different cross-sectional sizes.

13 Claims, 3 Drawing Sheets

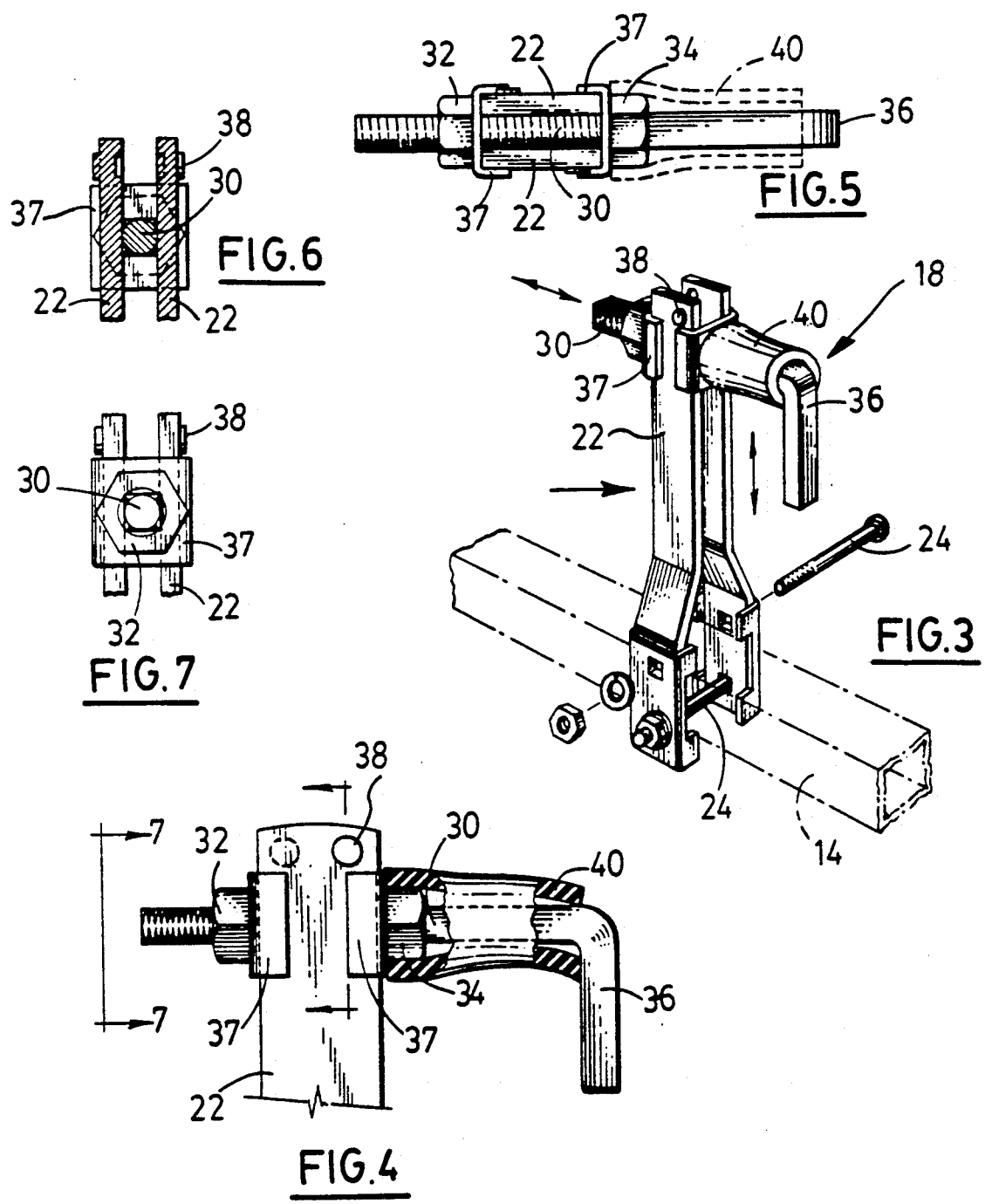

RETAINER ASSEMBLIES FOR ELONGATED OBJECTS

FIELD OF THE INVENTION

This invention is concerned with improvements in or relating to retainer assemblies for use in combination with longitudinally-spaced parallel supporting members, such as an automotive roof rack, in order to retain thereon elongated objects such as ladders.

DESCRIPTION OF THE PRIOR ART

A ladder is commonly employed by most tradesmen, and must be carried from place to place on the tradesman's vehicle, usually a panel truck or van. Often several different types of ladders are carried and they usually are too long or too awkward to be carried inside the vehicle; the usual solution is therefore to carry it or them on transversely-extending, longitudinally-spaced roof rack bars or a roof rack frame attached to the vehicle roof. The problem then arises of attaching the ladder/s to the bars or frame so that it can quickly and securely be mounted, and also quickly be removed when wanted. Various methods are used, such as tying down with rope, straps, or elasticised hooked tie-downs, but these are time-consuming to secure and release, and also involve awkward and time-consuming storage, location and gathering of the tie-down material. Other mechanical securing structures have been proposed hitherto, such as the ladder racks described and shown in U.S. Pat. Nos. 3,826,390; 3,877,624; 3,888,398; 3,904,094; and 4,262,834, and no doubt these perform very well, but they are relatively specialised or somewhat complicated and correspondingly expensive.

DEFINITION OF THE INVENTION

It is an object of the invention therefore to provide a new retainer assembly that is exceptionally simple and inexpensive to manufacture, while providing secure mounting and simple and rapid mounting and dismounting.

In accordance with the invention there is provided a retainer assembly for use in combination with a support member to retain an elongated object on the support member, the, assembly comprising;

a body member having at one end attachment means for its attachment to the support member so as to extend generally vertically therefrom;

a transverse member extending from the body member spaced from the support member to provide a respective vertically-extending gap between them through which the elongated object passes for its retention by the assembly;

the transverse member having a retainer portion extending generally parallel to the body member to provide a respective horizontally-extending gap through which the elongated object passes for its retention by the assembly; and a compressible resilient member on the transverse member between the body member and the retainer portion that is compressed by insertion of the elongated object through the horizontally-extending gap and its subsequent engagement with the support member, so that the compressed resilient member holds the elongated object in retaining engagement with the support member.

DESCRIPTION OF THE DRAWINGS

Particular preferred embodiments of the invention will now be described, by way of example, with reference to the accompanying diagrammatic drawings, wherein:

FIG. 3 is a perspective view of a single retainer assembly, shown mounted on a square cross-section carrier bar, with one of the fastening bolts shown exploded;

FIG. 4 is a front elevation of the upper part only of a single retaining element with the resilient sleeve thereof shown broken away for clarity of illustration;

FIG. 5 is a plan view from above of the single retainer assembly of FIG. 4, the resilient sleeve being shown in broken lines;

FIG. 6 is a section taken on the line 6—6 in FIG. 4;

FIG. 7 is a section taken on the line 7—7 in FIG. 4;

DESCRIPTION OF THE PREFERRED EMBODIMENTS

Figure 1:
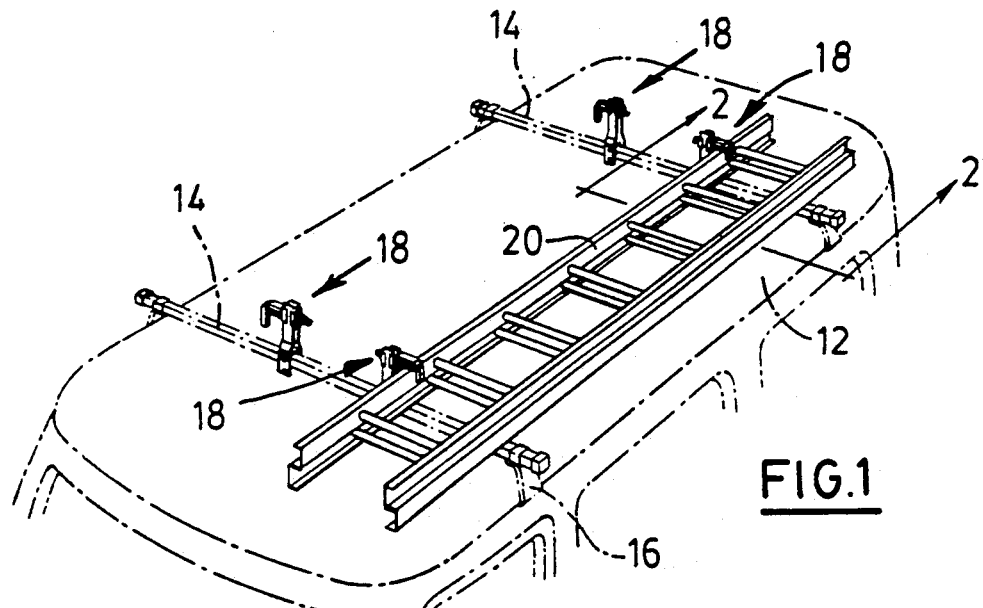
FIG. 1 is a perspective view from above, showing in broken lines part of the top of a van on which are mounted two sets of retainer assemblies which are first embodiments of the invention.
Figure 2:
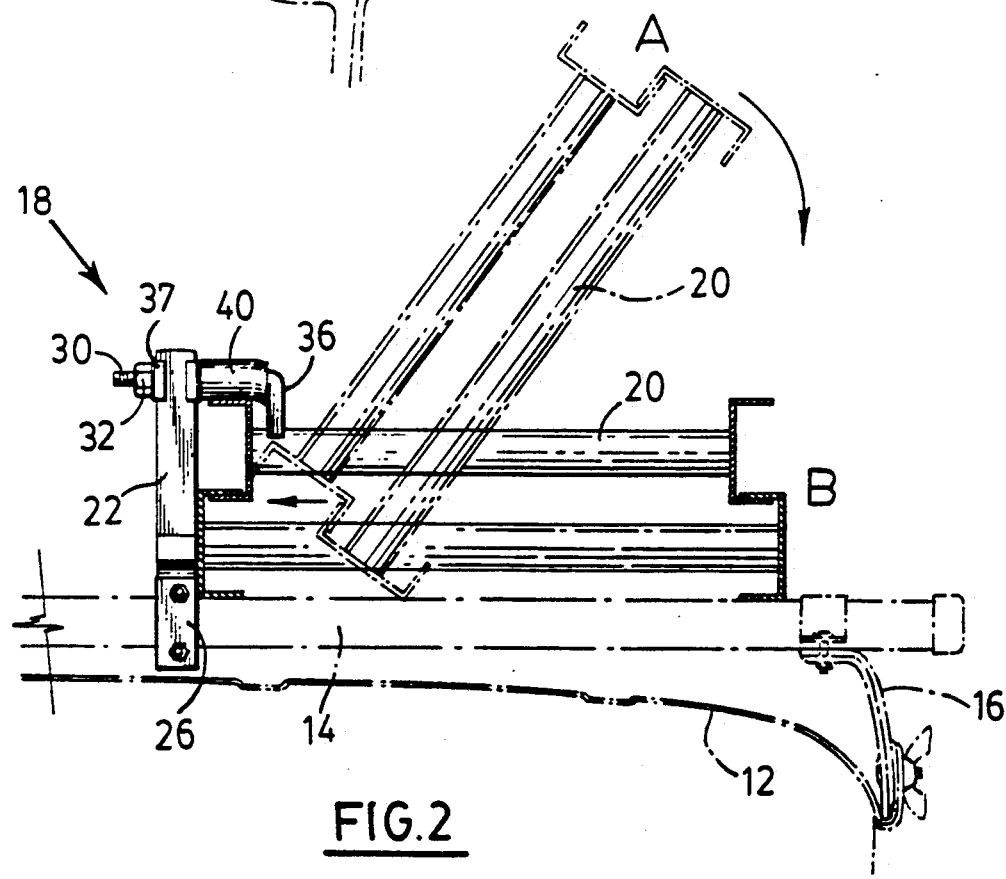
FIG. 2 is a part sectional end front view taken on the line 2—2 of FIG. 1, showing also in broken lines a ladder in attitude ready for mounting.
Figure 12:
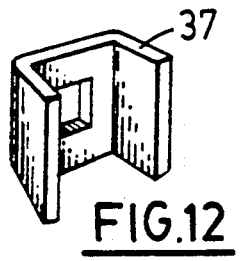
FIG. 12 is a perspective view of one of the brackets used in mounting each transverse member on its respective body member.

The invention is particularly described as applied to the carriage of an extension ladder on the roof of an automotive van 12 but, as will become apparent, is also usable in other applications, such as the storage of other elongated objects, and storage of such objects at other locations, such as in a basement or storage room. For this specific purpose the van roof is provided with a pair of longitudinally-spaced, transversely-extending, parallel roofrack crossbars 14, secured to the roof in any suitable known manner by rack support members 16. Two sets of retainer assemblies 18 are provided, each consisting of two assemblies attached to the respective crossbars 14 in longitudinal alignment with one another, so as to be able to mount two ladders or the like on the roof. One such ladder 20 is shown in FIGS. 1 and 2; in both figures the ladder is shown in solid lines in its fully mounted position, while in FIG. 2 it is also shown in broken lines in the attitude it must assume to be mounted and dismounted.

Figure 8:
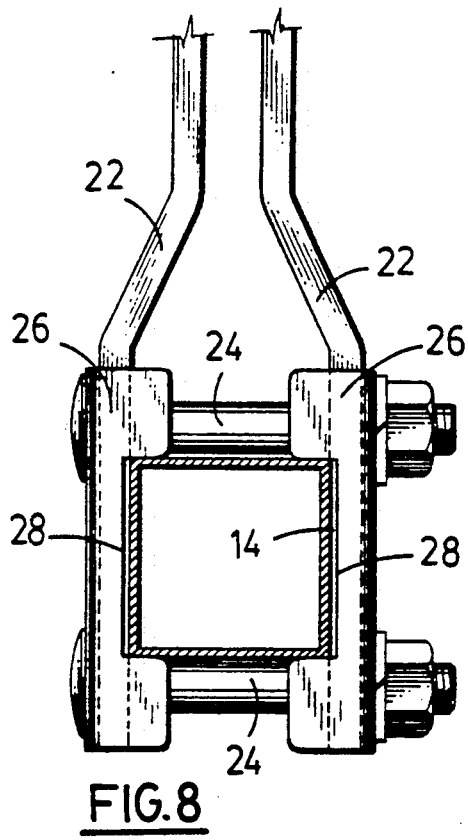
FIG. 8 is a front elevation of the lower part only of the first embodiment showing to a larger scale the stabilizer brackets that are used in conjunction with a square cross-section rack bar.
Figure 10:
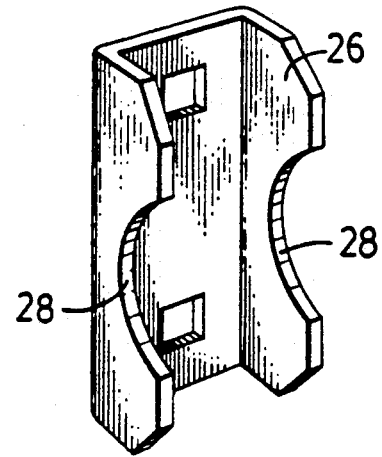
FIG. 10 is a perspective view of a stabilizer bracket for use with a round cross-section rack bar.
Figure 11:
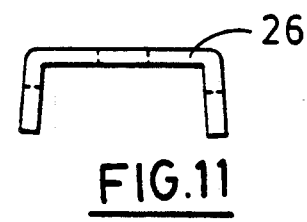
FIG. 11 is a plan view of the stabilizer bracket of either FIG. 9 or 10 to show the slight splay of its side walls.

Each assembly has a body member consisting of two vertically-extending parallel flat straps or thin bars 22, which are cranked close to their lower ends, so that those ends are more widely spaced than the upper ends. Two vertically-spaced bolts 24 each employing a respective nut to constitute bolt retaining means extend between the two straps, one above and one below the respective crossbar in close proximity thereto, the two bolts passing through respective apertures in two stabilizer members 26 which are of U-shape in both cross-section and side elevation, the members being provided with respective notches 28 of rectangular shape that receive the square cross-section bar 14. The bolt retaining means are tightened to hold the body member securely on the crossbar; it will be noted from FIG. 8 that the notches 28 are sufficiently deep to ensure that there is a clearance between their bottom edges and the adjacent side walls of the crossbar 14, thereby permitting the straps 22 to be held firmly by the bolt retaining means in butting contact with the crossbar sides. If the crossbar 14 is of round cross-section then the stabilizer members 26 of FIG. 10 are employed, with which the edges of the notches 28 are semi-circular segments. It will also be noted from FIG. 11 that the side walls of the stabilizer members are slightly splayed or angled outwardly to facilitate their placement on the straps 22.

Figure 13:
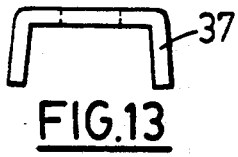
FIG. 13 is a plan view of the if the bracket of FIG. 12 to show the slight splay of its side walls.
Figure 9:
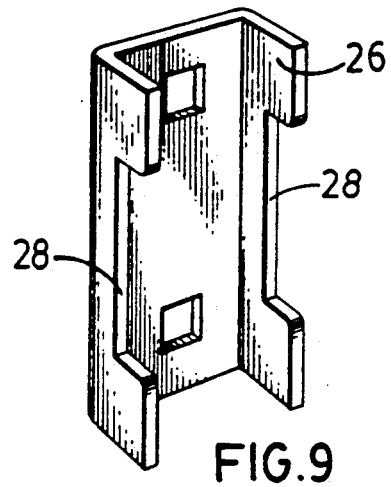
FIG. 9 is a perspective view of one of the stabilizer brackets of FIG. 8.

A transverse member 30 is screw-threaded for a substantial portion of its length from one end, this end portion receiving two nuts 32 and 34, while the other end is turned at a right angle to constitute a hook-like retainer portion 36. The screw threaded portion passes through two U-shaped brackets 37 that embrace respective sides of the body member straps 22 and that can be pressed in tight clamping retaining engagement with the straps by tightening the two nuts 32 and 34. Before the nuts are tightened the transverse member can be moved to any desired position along the body member straps (as indicated by the vertical arrow in FIG. 3) to provide a vertically extending gap between the bar 14 and the transverse member of predetermined height suited to the corresponding dimension of the ladder 20, and can then be clamped securely in that position quickly and simply by use of a pair of suitable wrenches. As will be seen from FIG. 13, the side walls of these brackets 37 are also angled outwards to facilitate their placement over the vertical straps 22, and also to permit easier vertical adjustment movement when the nut 32 is loosened and the brackets are retracted slightly to relieve their corner contact. Projecting stops 38 are provided at the top ends of the straps 22 to ensure that the member is not inadvertently pushed off their ends.

The transverse member is clamped by the nuts 32 and 34 with its retainer portion extending vertically downwards parallel to the straps 22 to form a retaining hook preventing both upward and sideways movement of the ladder, and to provide that the vertical-extending gap is of a width suited to the corresponding horizontal dimension of the engaged legs of the ladder 22. This gap dimension can readily be adjusted (as indicated by the horizontal arrow in FIG. 3) by adjusting the position of the nut 34 along the screw-threaded portion of the transverse member and then tightly clamping the nut 32 against the respective bracket 37. The nut 34 and the portion of the transverse member between the nut and the retainer portion 36 are enclosed by a sleeve 40 of any suitable weather-resistant resilient material so as to be disposed in the vertically-extending gap.

The ladder 22, or any other elongated object of equivalent cross-sectional shape, is mounted in the manner illustrated by FIG. 2. Thus, with the ladder in the tilted attitude "A" the longitudinal edge of one pair of the ladder side legs is passed through the horizontally-extending gap into the vertically-extending gap; the ladder is then rotated downwards, clockwise as seen in FIG. 2, to the mounted and secured position "B" in which it rests on the two crossbars 14. To reach this mounted position the upper edge of the ladder legs must engage and tightly compress the facing portion of the sleeve 40, this compression being facilitated by the weight of the ladder which rotates it downwards.

The ladder now cannot move either upwards because it is sandwiched between the crossbar 14 and the transverse member 30, or sideways because it is sandwiched between the straps 22 and the retainer portion 36; the resilient sleeve 40 also acts as a spring retainer means to ensure that the ladder does not escape from the retainer assembly and does not bounce on the crossbars 14 under normal travelling conditions. The ladder is removed equally easily without the use of tools by rotating it to the altitude "A" in FIG. 2 and then moving it sideways through the horizontally-extending gap.

It will be seen therefore that we have provided an inexpensive, simple but efficient method of securing a ladder to vehicle carrier crossbars or the like, or to any equivalent stationary frame, without having to use a separate tie-down device, and without any complicated or moving parts required to hold the ladder in retention. It also provides a simple but secure method of adjustment in two directions after the units are mounted in order to compensate for various crosssectional sizes of ladders; a one-time adjustment is made when using the same ladder, but it is easy to change if switching to another ladder of a different sectional size. We have also provided a retainer assembly which allows for practical and simple methods of manufacture thereof from relatively standard parts, thereby keeping costs to a minimum.

The embodiments of the invention thus constitute sturdy units which attach easily and securely to carrier bars, with only two bolts needed to clamp each unit rigidly to the carrier bars; stabilizer brackets are provided to assure that the units are maintained in good vertical alignment on square or round bar type carriers. Each unit has a simple and efficient method for vertical and lateral adjustment to adjust for various sectional sizes of ladders being used. A one time adjustment is made when using the same ladder, but the adjustment is simple to change when a ladder of different sectional size is used. The units are completely self contained and do not require tie downs, ropes or other accessories to maintain, store or locate. There are no moving parts, springs or levers to actuate in order to retain a ladder on the assemblies, thereby eliminating the possibility of failure of parts and the requirement for maintenance.

I claim:

1. A retainer assembly for use in combination with a support member to retain on the support member an elongated object having two transversely spaced longitudinal sides and having a predetermined height when in a horizontal position thereon, the assembly comprising;

a body member having an one end attachment means for its attachment to the support member and adapted when so attached to extend generally vertically therefrom;

a transverse member extending from the body member to be generally parallel to the support member and to be spaced from the support member to provide between them a respective vertically-extending gap of height just greater than said predetermined height of the elongated member, into which gap one side of the elongated object is inserted generally horizontally, said one side being so inserted with the other side elevated above the support member and the other side then being rotated downward onto the support member until the elongated member is in said horizontal position for its retention by the assembly;

means connected between said transverse member and said body member for preventing said transverse member from movement in any direction on said body member and relative to the support member;

the transverse member having a retainer portion extending generally parallel to the body member to provide a respective horizontally-extending gap of smaller height than said vertically-extending gap and adapted to receive said one side of the elongated object when inserted therethrough, the retainer portion being adapted to engage the elongated object in its horizontal position and retaining it against transverse movement out of the vertically-extending gap; and a compressible resilient member on the transverse member between the body member and the retainer portion, the uncompressed resilient member reducing the height of the vertically-extending gap to less than said predetermined height of the elongated object and being adapted to be compressed generally vertically by said one side of the elongated object upon said insertion thereof into the vertically-extending gap and the subsequent downward rotation of the other side into engagement with the support member, so that the compressed resilient member will apply vertical pressure to the elongated object and hold it in retaining engagement with the support member against movement in any direction thereon.

2. A retainer assembly as claimed in claim 1, wherein the transverse member is adjustably mounted on the body member for vertical movement thereon to permit adjustment of the height of the vertically-extending gap.

3. A retainer assembly as claimed in claim 1, wherein the transverse member is adjustably mounted on the body member for horizontal movement thereon to permit adjustment of the width of the vertically-extending gap.

4. A retainer assembly as claimed in claim 1, wherein the transverse member is adjustably mounted on the body member for both vertical and horizontal movement thereon to permit adjustment of both the height and the width of the vertically-extending gap.

5. A retainer assembly as claimed in claim 1, wherein the body member comprises two parallel strap members for extension on respective sides of the support member, and the attachment means include fastening means urging the strap members toward each other so as to clamp the support member between them for their retention thereon.

6. A retainer assembly as claimed in claim 5, and including stabilizer bracket members each interposed between a respective strap member and the fastening means and shaped to closely embrace the support member.

7. A retainer assembly as claimed in claim 6, wherein the support member is of rectangular cross-section and the bracket members are notched with rectangular notches to embrace the support member, the notches being sufficiently deep that there is clearance between their bottom edges and the adjacent walls of the support member to permit the strap members to be butted tightly against the said walls.

8. A retainer assembly as claimed in claim 6, wherein the stabilizer bracket members are of U-shaped transverse cross-section with the walls angled outwardly to facilitate their placement on the respective strap member.

9. A retainer assembly as claimed in claim 1, wherein the transverse member includes a screw-threaded portion passing through the body member and at least one nut on the screwthreaded portion engaging the body member to maintain the transverse member at a predetermined height on the body member and thereby provide a vertically-extending gap of corresponding predetermined height.

10. A retainer assembly as claimed in claim 9, wherein the transverse member includes two bracket members on either side of the body portion held in retaining abutting contact with the body member by the nut on the transverse member.

11. A retainer assembly as claimed in claim 10, wherein the bracket members are of U-shaped transverse cross-section with the walls angled outwardly to facilitate their placement on the body member.

12. A retainer assembly as claimed in claim 10, wherein the transverse member includes two nuts on the screw-threaded portion permitting adjustment of the length of the transverse member between the body member and the retainer portion and thus of the width of the horizontally-extending gap.

13. A retainer assembly as claimed in claim 1, wherein the resilient member is a sleeve of resilient material enclosing the portion of the transverse member between the body member and the retainer portion.

* * * * *